Sept. 6, 1960 E. J. RICKNER ET AL 2,951,991
TRANSISTOR SERVO AMPLIFIER
Filed Dec. 9, 1957
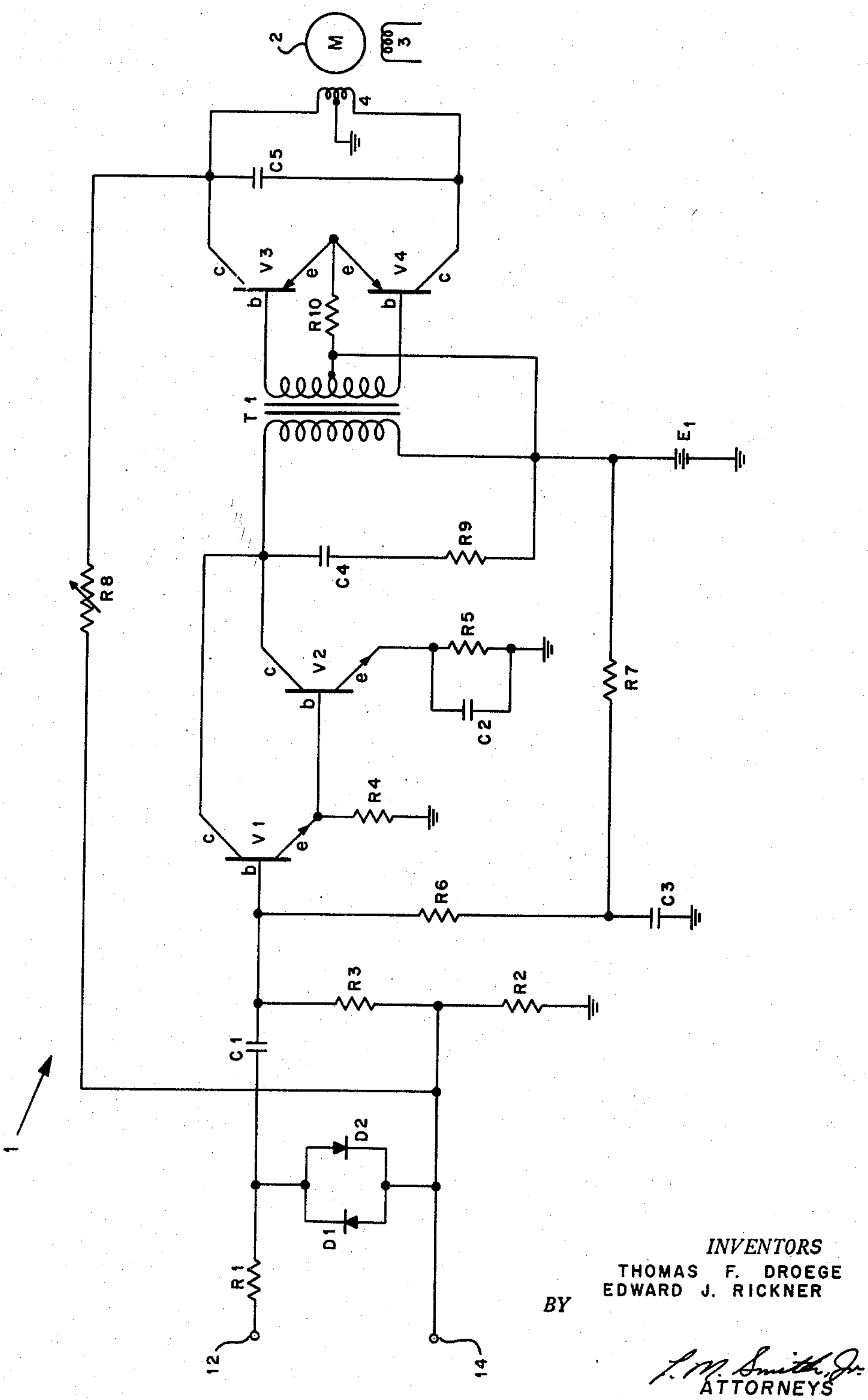
INVENTORS
THOMAS F. DROEGE
EDWARD J. RICKNER
BY
ATTORNEYS United States Patent Office 2,951,991

Patented Sept. 6, 1960

2,951,991

TRANSISTOR SERVO AMPLIFIER

Edward J. Rickner, Hartsville, and Thomas F. Droege, Hatboro, Pa., assignors to the United States of America as represented by the Secretary of the Navy Filed Dec. 9, 1957, Ser. No. 701,686

9 Claims. (Cl. 330—32)

(Granted under Title 35, U.S. Code (1952), sec. 266)

The invention described herein may be manufactured and used by or for the Government of the United States of America for governmental purposes without the payment of any royalties thereon or therefor.

The present invention relates to a transistorized servo amplifier and more particularly to a highly stable transistorized servo amplifier having features for reducing variations in gain and compensating for changes in transistor parameters due to varying ambient temperature conditions.

Present servo amplifiers employ vacuum tubes and/or magnetic amplifier elements which are relatively large in size, heavy in weight, and inefficient. Due to the presence of these elements, there is considerable heating in the amplifier resulting in problems of heat dissipation when attempting to use several amplifiers in a confined space. In addition, the high power demands of these elements cause high power drain from the power source.

The present invention provides for a completely transistorized servo amplifier which avoids to a great extent the disadvantages of the older type amplifiers described above. In addition to obtaining the expected benefits of less bulk, weight, and reduced heat due to the use of transistors, the transistorized servo amplifier described herein has provision for maintaining the gain of the various transistor stages at a uniform level over its range of operation and also by a novel arrangement of circuitry compensating for a known disadvantage of transistors which is to have its characteristics vary markedly over varying ambient temperature conditions.

It is thus an object of the present invention to provide a highly stable transistorized servo amplifier which is compact and light in weight and capable of driving a servo motor.

Another object is the provision of a servo amplifier which is efficient by requiring less power drain than heretofore appeared possible.

A further object of the invention is the provision of a servo amplifier which produces less heat than conventional servo amplifiers.

Still another object is to provide a transistorized servo amplifier having controlled gain characteristics over the range of operation.

Another object is to provide a transistorized servo amplifier having provision for compensating for changes in transistor characteristics over a wide range of ambient temperature conditions.

The exact nature of this invention as well as other objects and advantages thereof will be readily apparent from consideration of the following specification relating to the annexed drawing in which there is shown a schematic representation of the present invention.

Referring to the drawing the transistorized servo amplifier 1 may be used to drive a servo motor 2 having a fixed phase coil 3 and a variable control phase coil 4 which receives the output of servo amplifier 1. The input signal to amplifier 1 is placed on input connections 12 and 14 and may be received, for example, from the rotor of a synchro control transformer (not illustrated) as is understood in the art. Amplifier 1 is provided with a first or preamplification stage consisting of silicon junction npn transistors V1 and V2, and a second power stage consisting of germanium pnp transistors V3 and V4. A resistor R1 and a pair of silicon diodes D1 and D2 arranged in opposite polarity are provided to limit signal strength and prevent damage to transistors V1 and V2 in the event of a signal of excessive voltage. As is understood in the art, silicon diodes D1 and D2 have the characteristic of extremely low current conductivity at potentials below some value in the forward direction. When the potentials are reversed, conduction does not occur until a much higher potential is reached. At a normal signal level, current through diodes D1 and D2 is negligible and the voltage drop across resistor R1 due to diode current is negligible. Should the signal voltage become excessive and increase above the value necessary for forward conduction, the current through one of the diodes D1 and D2 will cause a voltage drop across R1 sufficient to limit the voltage applied to transistor V1 to a safe low value.

Input lead 12 is connected to the base of transistor V1 through resistor R1 and a coupling capacitor C1. The other input or signal lead 14 is applied to ground through a resistor R2 which forms part of a feedback network, as hereinafter explained. A resistor R3 between the base of transistor V1 and input lead 14 is provided for a purpose to be later described. The collectors of transistors V1 and V2 are connected through the primary coil of a transformer T1 to the positive side of battery or other D.C. source E1. The negative terminal of source E1 is grounded. The ground return path for the emitter of transistor V1 is through a resistor R4 which is in parallel with a path through the base of transistor V2. A resistor R5 having an A.C. bypass capacitor C2 makes the ground connection for the emitter of transistor V2. Positive base potentials for transistors V1 and V2 are provided from the voltage divider network consisting of resistors R2, R3, R6 and R7 which are series connected across source E1. Resistor R4 which is connected between ground and the emitter of transistor V1 insures base supply for transistor V2 for reasons later explained. A variable resistor R8, which is connected between one end of the variable phase rotor 4 of motor 1 and the signal input connection 14, is of much higher value than resistor R2 and therefore D.C. current flow through resistor R8 has a negligible effect on the D.C. potential of the divider network just described. Resistor R7, which forms part of the divider network described above, may be provided with a bypass capacitor C3 to prevent an A.C. ripple voltage that may appear on E1 from being imposed on the bases of transistors V1 and V2. Resistor R6 is of sufficient high value to prevent the signal from being bypassed to ground through capacitor C3. The primary coil of transformer T1 is provided with a capacitor C4 and a resistor R9 to produce a leading current that effectively cancels the lagging excitation current of transformer T1 so that the load as seen by the collector of transistor V2 is essentially the reflected base to base impedance of transistors V3 and V4 described below plus the load represented by the power loss of transformer T1. The use of capacitor C4 and resistor R9 also tends to reduce the overall phase shift in the amplifier as normally caused by the quadrature excitation current of the transformer. By proper selection of the values of C4 and R9 the network consisting of C4 and R9 and transformer T1 will appear to transistors V1 and V2 as a pure resistance for a wide range of frequencies.

Germanium transistors V3 and V4 are connected in a push-pull arrangement with the bases thereof connected to the opposite ends of the secondary of transformer T1. The bases are essentially at the positive supply potential since the center tap of the secondary of transformer T1 is connected to the positive side of source E1 and the transformer secondary is of very low D.C. resistance. The emitters of transistors V3 and V4 are connected to the positive side of E1 through a resistor R10, while the collectors of transistors V3 and V4 are connected across the variable phase coil 4 of servo motor 1. The center tap of variable phase coil 4 is grounded. A capacitor C5 across coil 4 causes a leading quadrature current that cancels the lagging quadrature current of motor 2 so that the load as seen from the collectors of V3 and V4 is essentially resistive. Resistor R10 is specially selected to have an increased resistance with temperature characteristic for a purpose to be described below. Thus, resistor R10 possesses a positive coefficient of resistivity.

Operation of amplifier 1 is as follows:

Optimum performance of transistors depends on maintaining the proper D.C. potentials and currents. The D.C. operating voltage for the base of transistor V1 is obtained from the junction of the resistors R3 and R6 which are part of the divider network consisting of resistors R2, R3, R6 and R7 between the high voltage supply and ground. Since the D.C. base current of transistor V1 is small compared to the current through the voltage dividing network just described, the potential on the base is essentially dependent on the values of the resistors and is affected only negligibly by the current therethrough. Resistor R4 provides an alternate path for the current through the emitter of transistor V1, and by proper selection of its value, the current flowing through the base of transistor V2 will be at a suitably low value. As a means of maintaining the D.C. collector current in transistor V2 at a constant value the emitter current of transistor V2 is made to flow through resistor R5 of relative high value so that the voltage drop from the base of transistor V1 to the emitter of transistor V2 is small in comparison to the drop across R5. Also, during the range of transistor operation, the voltage drops from base to emitter in transistors V1 and V2 are substantially constant. Thus a constant voltage drop will be maintained across R5. Since emitter current is equal to collector current except for small base current, the D.C. collector current through V2 is independent of changes in ambient temperature and is determined solely by the voltage placed on the base of transistor V1.

In the germanium transistors V3 and V4 which have the characteristic of increasing D.C. current with increasing temperature provided the base and collector to emitter potentials are maintained constant, temperature compensation is accomplished by resort to the use of resistor R10 which is selected for having the characteristic of increasing resistance with temperature. The secondary of transformer T1 has a low D.C. resistance. Hence, the bases of the output transistors V3 and V4 are essentially at the positive supply voltage. The emitters of these transistors are connected to the positive supply voltage through resistor R10. Thus, increasing emitter current, which is essentially the same as the collector current, causes an increased voltage drop across resistor R10 with the result that the potential on the emitters of transistors V3 and V4 increases negatively with respect to the potential at the bases of these transistors. As a result, the voltage drop across resistor R10 due to increased current tends to partially offset the collector current increase while a higher potential drop at higher temperature is caused which further increases the amount of compensation over that which would be obtained with a resistor that remains constant with temperature. An example of a resistor R10 having this characteristic is a copper wire wound element.

Regarding the A.C. amplification of transistorized servo amplifier 1, the signal voltage is applied to the base of transistor V1 through coupling condenser C1. As is understood in the art, changes in base current cause a substantially higher change in the collector current provided that there is no large change in collector to emitter voltage. The emitter current of transistor V1 is the sum of the base and the collector currents. Since the base current is small and the emitter current may be considered substantially the same as the collector current, the A.C. emitter current of transistor V1 is the sum of the A.C. current through resistor R4 and the A.C. base current of the transistor V2. The A.C. impedance between the base of transistor V2 and ground is considerably lower than resistance R4, hence the A.C. base current of transistor V2 is substantially the same as the A.C. emitter current of transistor V1. The A.C. base current of transistor V2 causes a large A.C. collector current as in the case of transistor V1. To obtain negative feedback, the collector of transistor V1 is connected to the collector of transistor V2 and so to the positive power source through the primary of transformer T1. A decrease in collector potential due to a swing up in A.C. collector current in transistor V2 and a bigger voltage drop across T1 causes a slight reduction in the collector current of transistor V1 and hence an accompanying decrease in amplification. This is evident from the static characteristic curves for silicon grown junction transistors (grounded emitter) in which for a constant base current the collector current decreases with decreasing collector voltage. This negative feedback feature tends to reduce the variations in gain of this stage resulting from variations in transistor parameters.

With the germanium transistors V3 and V4 connected as illustrated to the output stage of transformer T1, the collector current is extremely small when there is no A.C. signal due to the relative negative bias on the emitters. When an A.C. signal appears across the secondary of transformer T1 each transistor will conduct only when the A.C. base potential is negative; thus, on one-half a cycle V3 conducts and on the other half cycle V4 conducts. This is essentially analogous to a push-pull class B vacuum tube amplifier. The collectors of this stage are connected to the center tap of the control phase winding 4 of the two-phase servo motor 1 and produce the required flux for running the motor. Capacitor C5 causes a leading quadrature current that cancels lagging quadrature current of the motor, so that the load as seen from the collectors of transistors V3 and V4 is essentially resistive.

A negative feedback loop about the entire amplifier is obtained by taking the A.C. potential on the collector of transistor V3 where it is 180° out of phase with the input and applying it to a point between resistors R2 and R3 in the voltage dividing network consisting of the resistors R2, R3, R4 and R7. The A.C. voltage drop across resistor R2 due to the A.C. collector potential is thus 180° out of phase with the applied signal, hence the voltage drop across R2 subtracts from the signal voltage thereby producing the negative feedback. The amount of negative feedback is controlled by regulating the value of resistor R8 and governs the overall gain of the amplifier.

A practical circuit of the type illustrated has been constructed and tested. While it will be understood that circuit specifications may vary according to the design for any particular application, the following circuit specifications are those used in the particular one constructed and tested, and are included by way of example:

D1 and D2—Silicon Diodes Texas Instrument Type 601C
V1—Silicon Transistor Texas Instrument Type 904
V2—Silicon Transistor Texas Instrument Type 951
V3 and V4—Germanium Transistor Minneapolis-Honeywell Type H-2
T1—Texas Instrument Transformer #65558
C1—.5 mfd., 150 v. G.E. Type 29F416

C2—140 mfd., 6 v. Fansteel PP140B6A1
C3—8 mfd., 30 v. Fansteel PP8B30A1
C4—.04 mfd., 200 v. Cornell Dubilier MTX2S4
C5—.68 mfd., 100 v. Good-All Type 615G R1—4700 ohms; R2—47 ohms; R3—12000 ohms; R4—10,000 ohms; R5—470 ohms; R6—39,000 ohms; R7—10,000 ohms; R8—greater than 2000 ohms, adjustable; R9—1000 ohms; and R10—10 ohms (9.2 ft. #40 wire wound on greater than 10,000 ½ w. composition resistor). All resistors ½ w.

It is thus seen that there has been provided a novel transistorized servo amplifier which is compact, light in weight and more highly efficient than other type amplifiers. In addition, it is seen that a novel way of providing temperature correction and stability in the operation of transistors is obtained. It should be understood of course that the foregoing disclosure relates to only a preferred embodiment of the invention and that numerous modifications or alterations may be made therein without departing from the spirit and the scope of the invention as set forth in the appended claims. For example, with proper changes in biasing arrangements, pnp type transistors can be used for the npn illustrated, and vice versa. In addition, under certain circumstances it may be possible and feasible to substitute germanium transistors for the silicon transistors V1 and V2, or substitute silicon transistors for the germanium transistors V3 and V4. However, as understood in the art, the latter substitutions will affect the selection of circuit parameters, operating points and alter the ranges of proper temperature operation which must be taken into account in designing a circuit having one or more of the aspects of this invention.

What is claimed is:

1. A multi-stage semi-conductor signal amplifier comprising first, second, third, and fourth semi-conductor devices each having an emitter, collector, and a base electrode, a D.C. voltage power source for use in biasing said devices, transformer means having the primary thereof connected between the collector electrode of said second device and one pole of said source for receiving the output of said second device and the secondary thereof between the base electrodes of said third and fourth devices, electrical connection means between the emitter electrode of said first device and the base electrode of said second device, a substantially resistive member connected from said emitter electrode of said first device to the opposite pole of said source, a resistive-capactive network means connected between the emitter electrode of said second device and said opposite pole of said source for insuring relatively constant collector current through said second device, means for applying a preselected portion of said source voltage to the base electrode of said first device to insure proper biasing thereof, first negative feedback means from the collector electrode of said second device to the collector electrode of said first device for stabilizing the gain of the first and second devices, a load impedance electrically connected between the collector electrodes of said third and fourth devices, means for connecting one of the poles of said source electrically to some point on the secondary of said transformer means and the other of the poles to some point on said load impedance, electrical resistance means electrically connected from the emitter electrodes of the third and fourth devices to said point on said secondary for compensating for changes due to temperature in the characteristics of said third and fourth devices, and input means with overload protection means for delivering an input signal for said amplifier to the base electrode of said first device.

2. A multi-stage semi-conductor signal amplifier comprising preamplification and power amplification stages, said preamplification stage including first and second semi-conductor devices each having an emitter, collector, and a base electrode, a D.C. voltage power source for use in biasing said devices, transformer means for coupling the stages having the primary thereof connected between the collector electrode of said second device and one pole of said source for receiving the output of said preamplification stage, electrical connection means between the emitter electrode of said first device and the base electrode of said second device, a substantially resistive member connected from said emitter electrode of said first device to the opposite pole of said source, a resistive-capacitive network means connected between the emitter electrode of said second device and said opposite pole of said source for insuring relatively constant collector current through said second device, means for applying a preselected portion of said source voltage to the base electrode of said first device, first negative feedback means from the collector electrode of said second device to the collector electrode of said first device for stabilizing the gain of the preamplification stage, said power amplification stage including a pair of semi-conductor devices each provided with an emitter, collector and a base electrode, means for connecting the secondary of said transformer means between the base electrodes of said power stage devices, a load impedance electrically connected between the collector electrodes of said power stage devices, means for connecting one of the poles of said source electrically to some intermediate point along the secondary of said transformer means and the other of the poles to some intermediate point along said load impedance, electrical means interconnecting the emitter electrodes of said power stage devices, automatically adjustable electrical resistance means connected between said intermediate point along said secondary and said interconnecting means for compensating for changes due to temperature in the characteristics of said power stage devices, input means with overload protection means for delivering the input signal for said amplifier to the base electrode of said first device, and second negative feedback means from the output of said power stage to said input means for stabilizing the gain of said amplifier.

3. A multi-stage semi-conductor signal amplifier comprising preamplification and power stages, said preamplification stage including first and second semi-conductor devices each having an emitter, collector, and a base electrode, a D.C. voltage power source for use in biasing said devices, transformer means for coupling the stages having the primary thereof connected between the collector electrode of said second device and one pole of said source for receiving the output of said preamplification stage, electrical connection means between the emitter electrode of said first device and the base electrode of said second device, a substantially resistive member connected from said emitter electrode of said first device to the opposite pole of said source, a resistive-capacitive network means connected between the emitter electrode of said second device and said opposite pole of said source for insuring relatively constant collector current through said second device, means for applying a preselected portion of said source voltage to the base electrode of said first device, first negative feedback means from the collector electrode of said second device to the collector electrode of said first device for stabilizing the gain of the preamplification stage, said power amplification stage including a pair of semi-conductor devices each provided with an emitter, collector and a base electrode, means for connecting the secondary of said transformer means between the base electrodes of said power stage devices, an inductive load impedance electrically connected between the collector electrodes of said power stage devices, means for connecting one of the poles of said source electrically to some intermediate point along the secondary of said transformer means and the other of the poles to some intermediate point along said inductive load impedance, electrical means interconnecting the emitter electrodes of said power stage devices, electrical resistance means having increased resistance with rise in temperature characteristic electrically connected between said intermediate point along said secondary and said interconnecting means for compensating for changes due to temperature in the characteristics of said power stage devices, input means with overload protection means for delivering the input signal for said amplifier to the base electrode of said first device, and second negative feedback means from the output of said power stage to said input means for stabilizing the gain of said amplifier.

4. A semi-conductor signal amplifier circuit comprising first and second semi-conductor devices each having an emitter, collector, and a base electrode, a first electrical connection between said collector electrodes, a second electrical connection between the emitter electrode of said first device and said base electrode of said second device, a direct current voltage power source for use in biasing said devices, an output load impedance means having relatively low direct current resistance for said amplifier circuit connected to said first electrical connection and to said one pole of said source, first electrical resistance means electrically connected between said second electrical connection and the opposite pole of said source, second electrical resistance means connected to said emitter electrode of said second device and to said opposite pole of said source, resistance network means including capacitor and resistance means connected across said output load impedance means to said first electrical connection and to said opposite pole of said source for producing a leading quadrature current that in effect cancels any lagging excitation current of said output load impedance means and for reducing overall phase shift in said amplifier circuit, voltage divider means connected across said voltage source, overload protection means electrically coupled to the base electrode of said first device and to an intermediate point on said voltage divider means.

5. A semi-conductor signal amplifier circuit comprising first and second semi-conductor devices each having an emitter, collector, and a base electrode, electrical connection means between said emitter electrode of said first device and said base electrode of said second device, a direct current voltage power source for use in biasing said devices, an output load impedance having relatively low direct current resistance for said amplifier circuit connected to said collector electrode of said second device and to said one pole of said source, first electrical resistance means electrically connected between said emitter electrode of said first device and the opposite pole of said source, second electrical resistance means connected to said emitter electrode of said second device and to said opposite pole of said source, voltage divider means connected to said voltage source and to said base electrode of said first device, feedback electrical connection means connecting said collector electrode of said second device to said collector electrode of said first device, resistance network means connected across said output load impedance means for producing a leading quadrature current that in effect cancels any lagging excitation current of said output load impedance means and for reducing overall phase shift in said amplifier circuit, and overload protection means electrically coupled to an intermediate point on said voltage divider means and to the base electrode of said first device.

6. A semi-conductor signal amplifier circuit comprising first and second semi-conductor devices each having an emitter, collector, and a base electrode, signal input means coupled to said base electrode of said first device, means coupling the emitter electrode of said first device to said base electrode of said second device, a direct current voltage power source for use in biasing said first and second devices, an inductance constituting an output load having relatively low direct current resistance connected between the collector electrode of said second device and one pole of said source, first relatively high voltage dropping means connected between the emitter electrode of said first device and the opposite pole of said source, second relatively high voltage dropping means connected between the emitter electrode of said second device and said opposite pole of said source, electrical connection means from the collector electrode of said second device to the collector electrode of said first device, and means for canceling any lagging quadrature current of said inductance and thereby reducing overall phase shift over a wide range of frequencies in said amplifier circuit.

7. A semi-conductor signal amplifier circuit comprising first and second semi-conductor devices each having an emitter, collector, and a base electrode, first electrical connection means between said emitter electrode of said first device and said base electrode of said second device, a direct current voltage power source for use in biasing said devices, an inductance constituting an output load having relatively low direct current resistance for said amplifier circuit connected between the collector electrode of said second device and one pole of said source, first electrical resistance means connected electrically between the emitter electrode of said first device and the opposite pole of said source, second electrical resistance means comprising a resistance parallelly connected to a capacitor connected between the emitter electrode of said second device and said opposite pole of said source, voltage divider means applying a preselected portion of said source voltage to the base electrode of said first device, second electrical connection means from the collector electrode of said second device to the collector electrode of said first device, signal input means with overload protection means electrically coupled in common with a portion of said voltage divider means to the base electrode of said first device for limiting input signals within predetermined amplitude levels, and said voltage divider means having first and second resistances and a bypass capacitor connected to said opposite pole of said source, said first resistance being provided with said bypass capacitor for preventing ripple voltage from being applied to said first and second devices, and said second resistance being of a high rate for preventing a signal from said signal input means from being bypassed to said opposite pole of said source through said bypass capacitor.

8. A semi-conductor signal amplifier circuit as set forth in claim 7, wherein said overload protection means comprise a pair of parallelly connected silicon diodes arranged in opposite polarity limiting the strength of said input signal from said signal input means.

9. A semi-conductor signal amplifier circuit as set forth in claim 7, further comprising resistance network means connected across said inductance producing a leading quadrature current that in effect cancels any lagging excitation current of said inductance.

References Cited in the file of this patent

UNITED STATES PATENTS

| | | |
|---|---|---|
| 2,603,708 | Anger | July 15, 1952 |
| 2,663,806 | Darlington | Dec. 22, 1953 |
| 2,663,830 | Oliver | Dec. 22, 1953 |
| 2,802,071 | Lin | Aug. 6, 1957 |
| 2,809,240 | Freedman | Oct 8, 1957 |
| 2,812,393 | Patrick | Nov. 5, 1957 |
| 2,861,239 | Gilbert | Nov. 18, 1958 |
| 2,918,629 | Bussard | Dec. 22, 1959 |

FOREIGN PATENTS

| | | |
|---|---|---|
| 204,099 | Australia | July 20, 1954 |